United States Patent [19]

Ohashi

[11] Patent Number: 5,130,867
[45] Date of Patent: Jul. 14, 1992

[54] MAGNETIC DISK UNIT UTILIZING A PREDETERMINED RANGE FOR THE FRICTIONAL COEFFICIENT BETWEEN THE MAGNETIC HEAD AND THE RECORDING MEDIUM

[75] Inventor: Hiroshi Ohashi, Tokyo, Japan

[73] Assignee: Kabushiki Kaisha Toshiba, Kawasaki, Japan

[21] Appl. No.: 534,706

[22] Filed: Jun. 8, 1990

[30] Foreign Application Priority Data

Jun. 9, 1989 [JP] Japan .................................. 1-145455

[51] Int. Cl.$^5$ .......................... G11B 5/60; G11B 17/02
[52] U.S. Cl. ...................................... 360/75; 360/103; 360/73.03
[58] Field of Search ................. 360/103, 104, 75, 73.03

[56] References Cited

U.S. PATENT DOCUMENTS

4,605,977  8/1986  Matthews .............................. 360/75
4,777,544  10/1988  Brown et al. ......................... 360/75
4,814,907  3/1989  Goor ..................................... 360/75

Primary Examiner—Robert S. Tupper
Attorney, Agent, or Firm—Foley & Lardner

[57] ABSTRACT

A magnetic disk unit has a magnetic head and a magnetic recording medium. The magnetic head records and retrieves information to and from the magnetic recording medium. In the magnetic disk unit the magnetic head and magnetic recording medium move relative to each other; and a device sets the frictional coefficient of the magnetic head and magnetic recording medium within an intermediate range extending from a minimum frictional coefficient point to a point where the durability of the magnetic head and the magnetic recording medium is not adversely affected. The range is determined, on a Stribeck diagram which indicates the relation of a relative velocity to a frictional coefficient of the magnetic head and magnetic recording medium.

9 Claims, 6 Drawing Sheets

(THIN - FILM RECORDING MEDIUM)

FIG.7b

(MAGNETIC - PAINTED RECORDING MEDIUM))

MAGNETIC DISK UNIT UTILIZING A PREDETERMINED RANGE FOR THE FRICTIONAL COEFFICIENT BETWEEN THE MAGNETIC HEAD AND THE RECORDING MEDIUM

BACKGROUND OF THE INVENTION

1. Field of the Invention

The present invention relates to a magnetic disk unit, and particularly to a magnetic disk unit having a large recording density and excellent durability.

2. Description of the Prior Art

The magnetic disk unit usually comprises a hard disk unit or a floppy disk unit.

Figure 1:
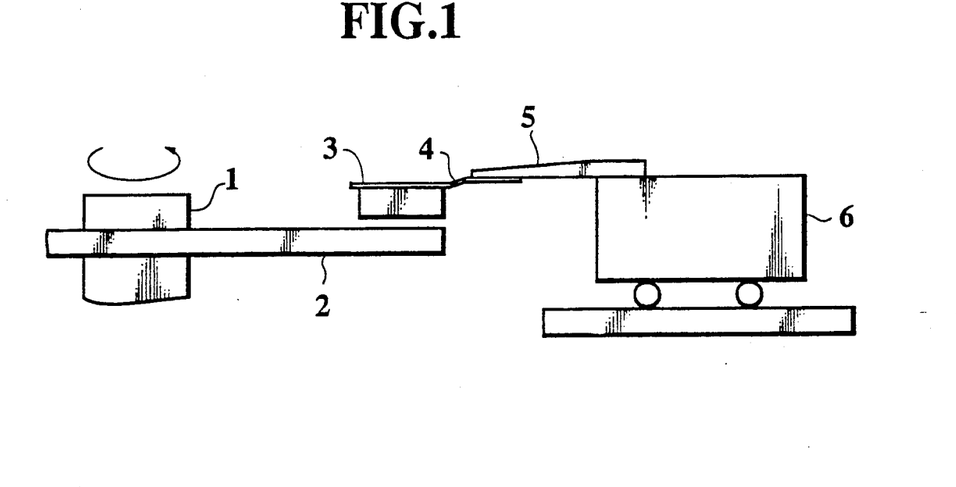
FIG. 1 is an explanatory view showing a conventional hard disk unit.

FIG. 1 shows an example of conventional hard disk unit.

The hard disk unit comprises a spindle 1, a disk-like magnetic recording medium (a magnetic disk) 2 driven by the spindle 1, and a magnetic head 3 whose sliding surface is spaced apart from the surface of the magnetic disk 2 by a predetermined distance. The magnetic head 3 is supported by a spring-like gimbal 4, which is supported by a suspension 5. The suspension 5 is cantilevered by a mover 6, which is movable along a radius of the magnetic disk 2. The magnetic disk 2 is made of an aluminum substrate.

When the magnetic disk 2 is rotated, an air flow, i.e., a thin air film is formed between the magnetic disk 2 and the magnetic head 3. This air film separates the magnetic head 3 from the magnetic disk 2 to cause no friction between them.

Unlike the hard disk unit, a conventional floppy disk unit allows, to some extent, friction to occur between a magnetic recording medium and a magnetic head. During use, a sliding surface of the magnetic head is in contact with the magnetic recording medium, which is made of a plastic substrate to reduce friction.

Figure 2:
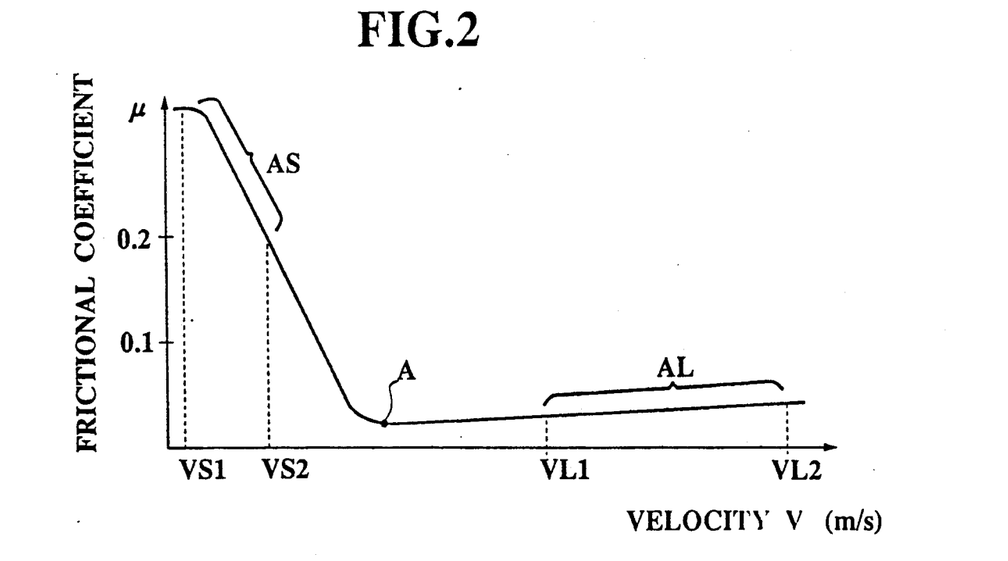
FIG. 2 is a Stribeck diagram showing a large velocity range AL and a small velocity range AS employed by a conventional hard disk unit and floppy disk unit.

FIG. 2 is a diagram showing the relation of a relative velocity V to a frictional coefficient $\mu$ between a magnetic head and a magnetic recording medium of a magnetic disk unit. The diagram is called a Stribeck diagram. The frictional coefficient $\mu$ is expressed as follows:

$$\mu = F/W$$

where F is a frictional force, and W is a load pushing the magnetic head downward.

As is apparent on the diagram, the frictional coefficient $\mu$ gradually decreases as the relative velocity V gradually decreases from its high-velocity state, and then the frictional coefficient suddenly increases after passing a minimum frictional coefficient point A. This phenomenon can be explained from a gap formed between the magnetic head and the magnetic recording medium. The gap is formed by the effect of an air film between the magnetic head and the magnetic recording medium in a range from the minimum frictional coefficient point A toward the higher velocity side on the Stribeck diagram. When the relative velocity V is reduced from the minimum frictional coefficient point A, the effect of the air film is reduced to reduce the gap and the magnetic head come in contact with the magnetic recording medium, thereby rapidly increasing the frictional coefficient $\mu$.

To avoid abrasion of the magnetic recording medium and magnetic head, the conventional hard disk unit is generally operated in a range AL of FIG. 2 where a sufficient gap is formed between the magnetic head and the magnetic recording medium. The range AL is defined by relative speeds VL1 and VL2.

Meanwhile, the magnetic recording medium suffers from an output loss, i.e., a spacing loss L which is expressed as follows:

$$L = K \cdot (d/\lambda)$$

where d is a distance from the magnetic head to the magnetic recording medium; $\lambda$ is a recording wavelength; and K is a proportional constant. To improve a recording density of the magnetic recording medium, the distance d must be as small as possible but is presently limited to about 0.2 $\mu$m by various factors such as surface roughness of the magnetic recording medium.

In terms of the distance d and recording density that depend on the relative velocity V, the relative velocity VL1 of FIG. 2 of the conventional hard disk unit is quite large compared to a relative velocity at the minimum frictional coefficient point A.

As explained before, the conventional floppy disk unit allows friction to occur on the magnetic recording medium (a floppy disk) to some extent, because the floppy disk is replaceable. The floppy disk unit is operated, therefore, in a range AS of FIG. 2 with a slower relative velocity V to improve a recording density of the floppy disk. The range AS is defined by relative velocities VS1 and VS2 where a gap between a magnetic head and the magnetic recording medium is small while a frictional coefficient $\mu$ is very large. The maxium velocity VS2 of the range AS is very small compared to that at the minimum frictional coefficient point A, thereby maintaining a narrow gap between the magnetic head and the magnetic recording medium.

The conventional hard disk unit operated in the high velocity range AL and the conventional floppy disk unit operated in the low velocity range AS both raise problems, as explained above, in their recording densities and durability.

SUMMARY OF THE INVENTION

As object of the present invention is to provide a magnetic disk unit having a large recording density and excellent durability to solve the above problems.

According to an aspect of the present invention, a magnetic disk unit comprises a magnetic head and a magnetic recording medium to and from which information is recorded and retrieved by the magnetic head. A frictional coefficient between the magnetic head and the magnetic recording medium is set within a range around a minimum frictional coefficient point on a Stribeck diagram that indicates the relation of a relative velocity to a frictional coefficient of the magnetic head and magnetic recording medium.

Figure 3:
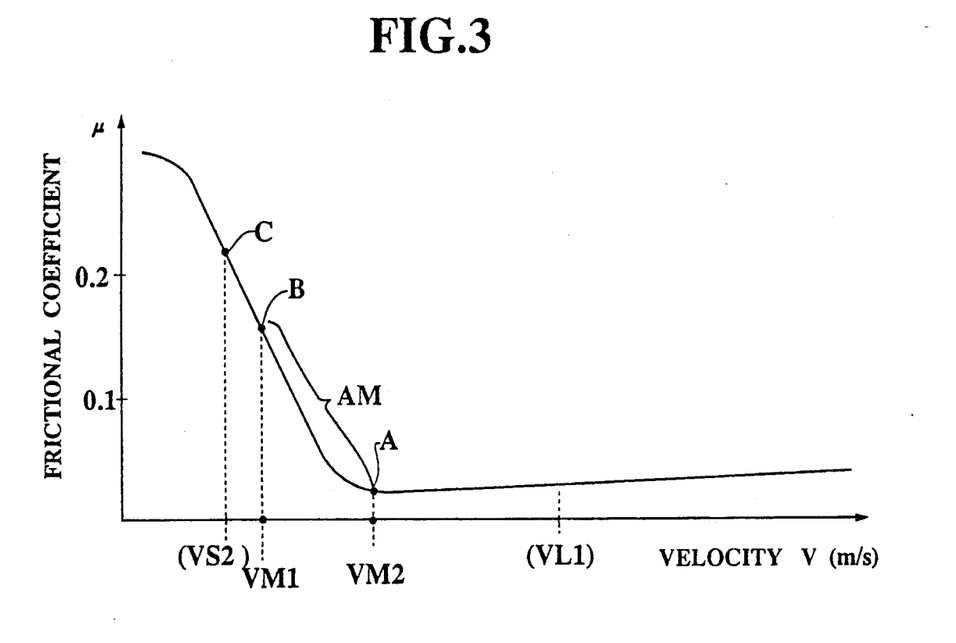
FIG. 3 is a Stribeck diagram showing an intermediate range AM employed by an embodiment of the present invention.

According to another aspect of the present invention, the frictional coefficient between the magnetic head and the magnetic recording medium is set within an intermediate range AM defined by a minimum frictional coefficient point A and by a point B on the Stribeck diagram in FIG. 3 beyond which deterioration of durability of the magnetic head and magnetic recording medium is too severe for practical use.

In the intermediate range AM, load applied to the magnetic head is lighter than applied in a slow velocity range AS of the conventional floppy disk unit, so that the magnetic head and magnetic recording medium are not abraded as much and, therefore, demonstrate longer service lives. Moreover, the magnetic head and magnetic recording medium of the present invention are slightly in contact with each other with a minute gap between them, thereby increasing a recording density.

These and other objects, features and advantages of the present invention will be more apparent from the following detailed description of preferred embodiments in conjunction with the accompanying drawings.

DETAILED DESCRIPTION OF THE EMBODIMENTS

FIG. 3 is a Stribeck diagram showing the relation of a relative velocity V to a frictional coefficient $\mu$ between a magnetic head and a magnetic recording medium of a magnetic disk unit.

In FIG. 3, the frictional coefficient $\mu$ becomes smaller as the relative velocity V is gradually decreased from a high velocity state, and after passing a minimum frictional coefficient A in the figure, the frictional coefficient suddenly increases.

The embodiment of the present invention employs a the minimum frictional coefficient point A as a reference in setting an intermediate range AM. Within this intermediate range AM, a magnetic disk unit of the present invention is operated. The intermediate range AM is defined by the minimum frictional coefficient point A and a point B where byond which deterioration of durability of the magnetic head and magnetic recording medium is too severe for practical use.

Frictional coefficients at the points A and B that define the intermediate range AM are x (x is variable according to the kind of the medium) and 0.15, respectively. In other words, the intermediate range AM is defined by a maximum relative velocity VM2 corresponding to the frictional coefficient x and a minimum relative velocity VM1 corresponding to the frictional coefficient 0.15. The intermediate range AM lines between the ranges AL and AS of the prior art shown in FIG. 2.

The point B where the magnetic head and magnetic recording medium do not suffer significant deterioration of durability is a limit where one or both of the magnetic head and magnetic recording medium can be fixedly used.

According to the conventional floppy disk unit operated in the slow velocity range AS defined by the maximum velocity VS2 (point C on the diagram of FIG. 3), the floppy disk must be replaced periodically. To deal with this problem of replacement, the present invention utilizes the point B that has a smaller frictional coefficient than that of the point C.

Durability (FIG. 4a), a recording density (FIG. 4b) and a gap (FIG. 4c) relative to a relative velocity, of the magnetic head and magnetic recording medium will be explained.

Figure 4A:
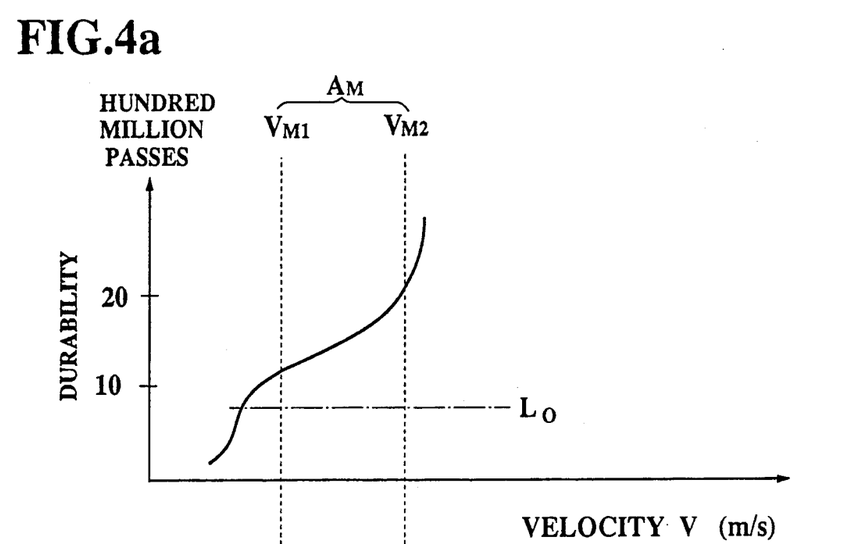
FIGS. 4a to 4c are explanatory views showing actions in the intermediate range AM.

The durability of FIG. 4a has been obtained from life tests. Between relative velocities VM1 and VM2, the durability is one to two billion passes that are higher than a required level L0. This means that any velocity between VM1 and VM2 is appropriate for fixedly using the magnetic head and magnetic recording medium. If the velocity is slower than VM1, the durability deteriorates to a level which is not appropriate for using them fixedly.

Figure 4B:
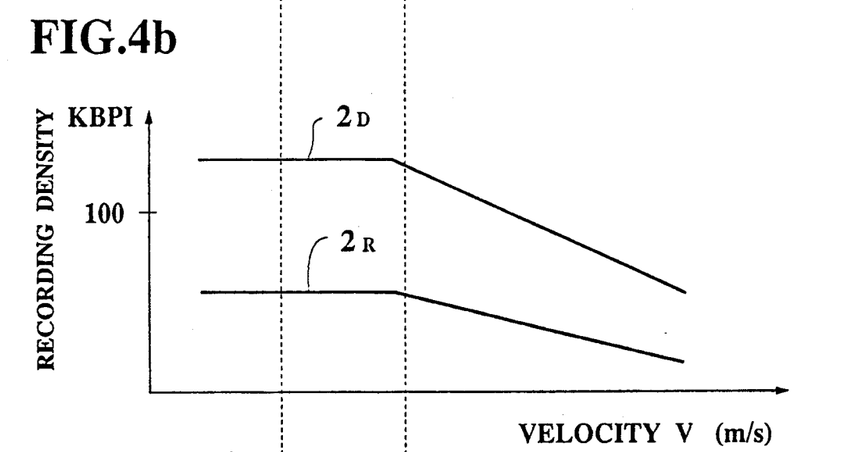

In FIG. 4b of recording density, two magnetic recording media 2D and 2R have different surface roughness provided by, for example, a metal thin film and a coat. Both of them can provide a sufficient recording density. The magnetic recording medium 2D has a smaller surface roughness than that of the medium 2R and, therefore, provides a higher recording density. As is apparent in FIG. 4b, the recording density becomes higher as the relative velocity V becomes slower, and from the point A of the present invention, the density becomes flat. Thereafter, the density does not increase much even if the relative velocity is further reduced. It is said, therefore, that the intermediate range AM employed by the present invention exists on the faster side of a range where a sufficient recording density is secured.

Figure 4C:
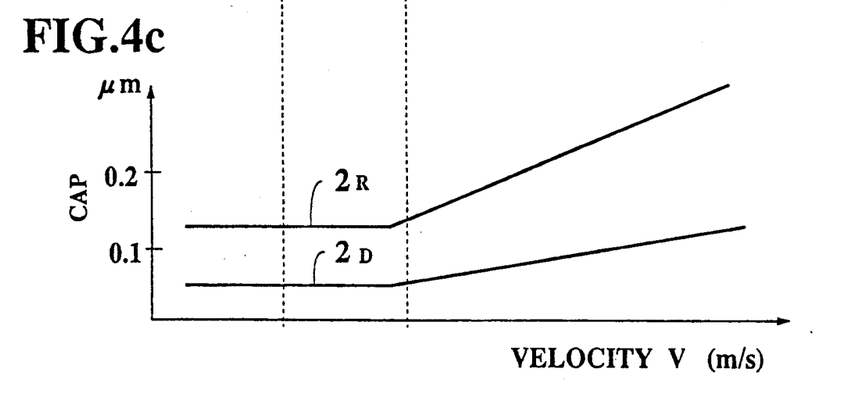

In FIG. 4c, each of magnetic recording media 2D and 2R having different surface roughnesses presents a minimum gap between the magnetic head and the recording medium at the point A of the present invention, while securing the recording densities of FIG. 4b.

As explained before, the spacing loss L is expressed as follows:

$$L = K \cdot (d/\lambda)$$

According to the embodiment of the present invention, the distance d is set to the minimum or very close to the minimum, thereby minimizing the spacing loss L.

By setting a relative velocity between the magnetic head and the magnetic recording medium within the intermediate range AM according to the present invention, a gap between the magnetic head and the magnetic recording medium will be very small as shown in FIG. 4c to minimize the spacing loss. At the same time, the recording density is improved as shown in FIG. 4b, the frictional coefficient is minimized or relatively reduced as shown in FIG. 3, and the durability suitable for permanent use of the magnetic head and magnetic recording medium is realized as shown in FIG. 4a.

According to tests on magnetic recording media provided with coats and metal thin films, it was found that, with a minimum frictional coefficient x of 0.035, the magnetic recording media can be fixedly used within a range defined by a frictional coefficient 0.04 where a maximum relative velocity is achieved and by a frictional coefficient 0.15 or below.

According to the magnetic disk unit of the present invention, a high recording density is realized without deteriorating durability. The present invention enables a coated medium to be employed in a hard disk unit, and reduces abrasion of a magnetic recording medium of a floppy disk unit, thereby expanding a range of selection of magnetic recording media.

The Stribeck diagram qualitatively indicates the relation of a frictional coefficient $\mu$ to a velocity V of a certain system. When parameters such as the ABS width of a head slider and head pushing load of the system are changed, the shape of the Stribeck diagram for the system will be changed. Namely, relative velocities of different systems have no relation to each other. Comparison of relative velocities is significant only if it is done within the same system or after normalizing the relative velocities at a minimum frictional coefficient point.

On the Stribeck diagram with the absolute values of velocities plotted on an abscissa thereof, any one of parameters related to friction other than the velocities may be changed to change the shape of the diagram. This will be explained in detail with reference to FIG. 5.

Figure 5:
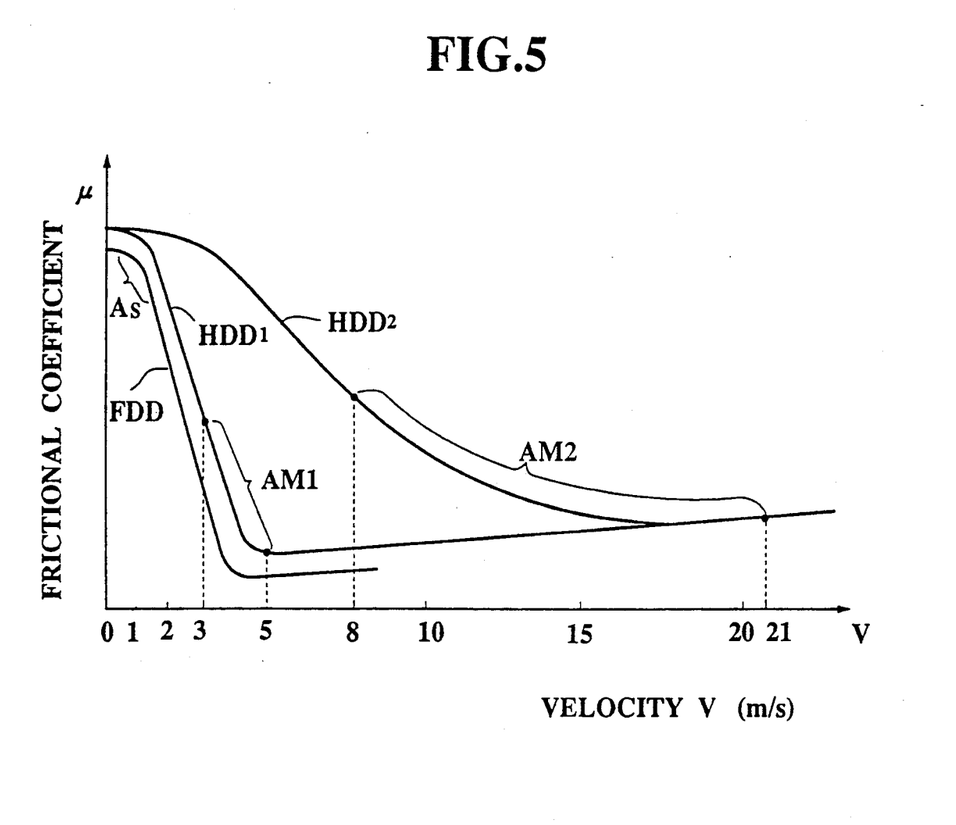
FIG. 5 is a graph showing characteristics of the embodiment of the present invention.

In the figure, a Stribeck curve FDD represents a system employing a floppy disk, and two Stribeck curves HDD1 and HDD2 represent systems each employing a 5-inch hard disk. The 5-inch hard disk has a radius in the range of 36 mm to 60 mm and is rotated at 3600 RPM.

On the curve HDD1, a range AM1 adopted by the present invention ranges from 3 m/s to 5 m/s in terms of relative velocity V. If it is required to achieve the present invention with a higher relative velocity, the ABS width of a head slider may be selected as one of parameters related to friction and narrowed to shift the system characteristics rightward, thereby providing the curve HDD2. On the curve HDD2, a range AM2 adopted by the present invention ranges from 8 m/s to 21 m/s, which are sufficiently fast.

The gist of the present invention is to bring a frictional coefficient of a magnetic head and magnetic recording medium of a magnetic recording unit into a predetermined range. Namely, the present invention does not intend to control a relative velocity of the magnetic head and magnetic recording medium. The frictional coefficient indicates contact conditions of the magnetic head and magnetic recording medium. The frictional coefficient range of the present invention is selected to form a smallest gap between the magnetic head and magnetic recording medium, thereby reducing friction between them. The gap and relative velocity depend on individual units.

According to the present invention, it is also possible to preset, for example, a range AM of relative velocities V, and change parameters relating to friction, thereby changing a system.

Figure 6:
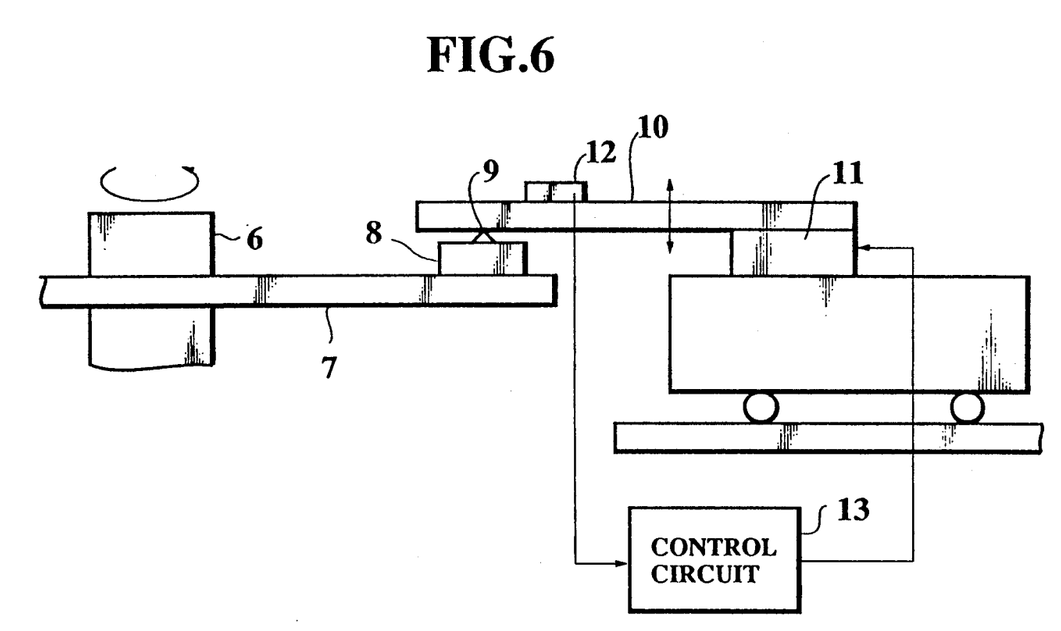
FIG. 6 is an explanatory view showing a magnetic disk unit according to the embodiment of the present invention.

FIG. 6 shows a magnetic disk unit according to an embodiment of the present invention.

In this embodiment, a distance between a magnetic disk surface 7 and a magnetic head 8 is selected as one of parameters relating to friction, and changed to shift the system.

The magnetic disk 7 is rotated at a preset relative velocity V, and an AE sensor detects a vibration sound generated between the magnetic disk 7 and the magnetic head 8. According to the detection, a control circuit 13 finds a frictional coefficient between the disk 7 and the head 8. To bring the frictional coefficient into the range AM on a Stribeck diagram by shifting the system according to the present invention, the control circuit 13 provides piezoelectric actuator 11 with a control signal. The piezoelectric actuator 11 then moves the magnetic head 8 up and down through an arm 10 that is connected to the magnetic head 8 through a suspension 9. This changes the distance between the magnetic head 8 and the magnetic disk 7. As a result, all the parameters are set to follow the range AM on the Stribeck diagram.

In the above embodiment, the parameter for shifting the system is the distance between the magnetic disk and the magnetic head. The parameter is not limited to the distance but may be the ABS width of the magnetic head, etc.

Figure 7A:
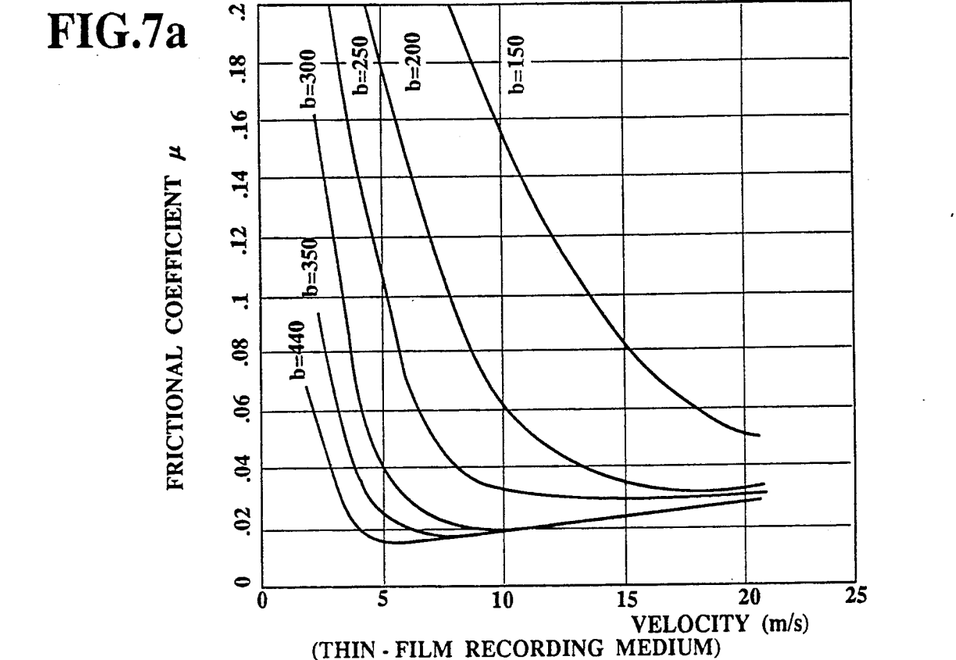
FIGS. 7a and 7b are Stribeck diagrams showing examples having different kinds of recording medium, respectively.
Figure 7B:
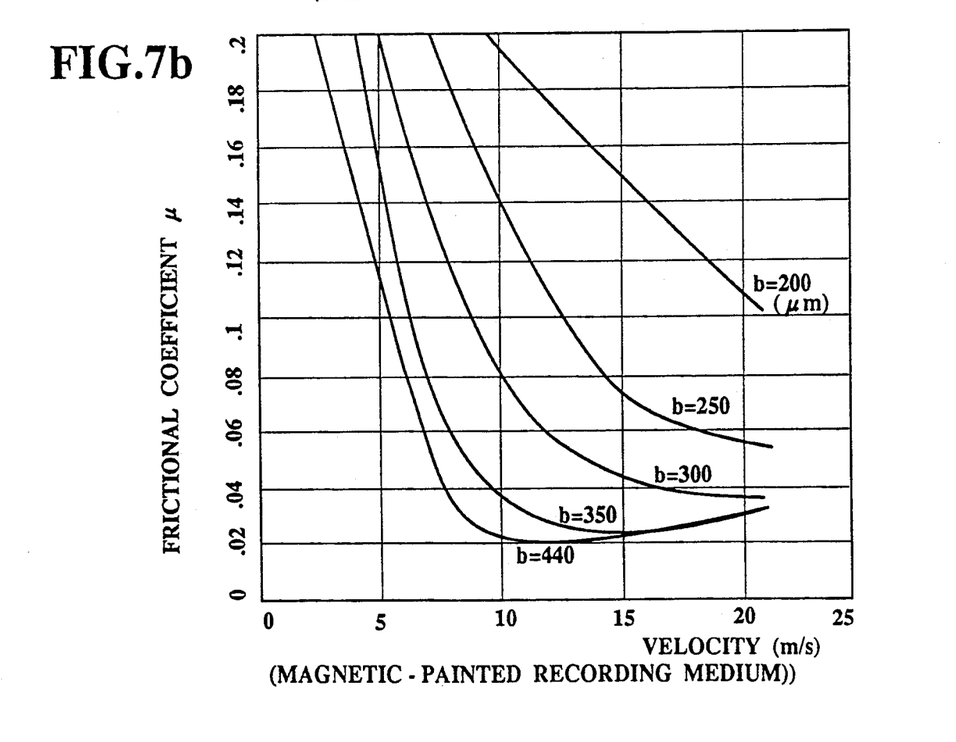

FIG. 7 show Stribeck diagrams in each of which the ABS width of the head slider is changed. In FIG. 7a, the magnetic recording medium is a metal thin-film recording disk and in FIG. 7b, it is a magnetic-painted recording disk.

According to the present invention, in FIG. 7a, when the rotational speed of the 5-inch metal thin-film recording disk is 3600 r.p.m, the weight of the head slider is about 9.5 g, and the relative velocity of the 5-inch recording disk and the head slider is in a range of 12~20 m/s, the ABS width of the head slider should be set in a range of about 150~200 $\mu$m in order to obtain the predetermined frictional coefficient.

In FIG. 7a, when the rotational speed of the 3-inch metal thin-film recording disk is 3600 r.p.m, the weight of the head slider is about 9.5 g, and the relative velocity of the 3-inch recording disk and the head slider is in a range of 8~12 m/s, the ABS width of the head slider should be set in a range of 170~250 $\mu$m, in FIG. 7a in order to obtain the predetermined frictional coefficient.

Other hand, in FIG. 7b when the rotational speed of the 5-inch magnetic-painted recording disk is 3600 r.p.m, the weight of the head slider is about 9.5 g, and the relative velocity of the 5-inch recording disk and the head slider is in a range of 12~20 m/s, the ABS width of the head slider should be set in a range of about 220~300 $\mu$m in order to obtain the predetermined frictional coefficient.

In FIG. 7b, when the rotational speed of the 3-inch magnetic-painted recording disk is 3600 r.p.m, the weight of the head slider is about 9.5 g, and the relative velocity of the 3-inch recording disk and the head slider is in a range of 8~12 m/s, the ABS width of the head slider should be set in a range of 250~350 $\mu$m, in FIG. 7b in order to obtain the predetermined frictional coefficient.

In summary, a magnetic disk unit of the present invention can solve the problems of the conventional hard disk unit such as a spacing loss and the problems of the conventional floppy disk unit such as abrasion, and improve a recording density and durability.

Various modifications will become possible for those skilled in the art after receiving the teachings of the present disclosure without departing from the scope thereof.

What is claimed is:

1. A magnetic disk unit having at least one magnetic head and a magnetic recording medium to and from which information is recorded and retrieved by the magnetic head, comprising:
    means for moving the magnetic head and magnetic recording medium relative to each other; and
    means for setting the frictional coefficient between the magnetic head and the magnetic recording medium within a predetermined intermediate range on a Stribeck diagram which indicates the relation of the relative velocity of the magnetic head and the magnetic recording medium to the frictional coefficient between the magnetic head and magnetic recording medium, said predetermined intermediate range extending from the minimum frictional coefficient point to a point where the frictional coefficient is 0.15 on the Stribeck diagram at which durability of the magnetic head and magnetic recording medium decreases beyond a predetermined amount.

2. The magnetic disk unit as claimed in claim 1, wherein, where the frictional coefficient at the minimum frictional coefficient point is 0.03 on the Stribeck diagram.

3. The magnetic disk unit as claimed in claim 2, wherein the setting means comprises:
   means for detecting a frictional state between the magnetic head and the magnetic recording medium; and
   means for changing the distance between the magnetic head and the magnetic recording medium according to a result of the detection, so as to set the frictional coefficient of the magnetic head and the magnetic recording medium within the predetermined intermediate range on the Stribeck diagram.

4. A magnetic disk unit comprising:
   a magnetic head;
   a 5-inch metal thin-film recording disk to and from which information is recorded and retrieved by the magnetic head;
   means for moving the magnetic head and 5-inch metal thin-film recording disk relative to each other, the relative velocity of the 5-inch metal thin-film recording disk and the magnetic head being in a range of approximately 12–20 m/s,
   wherein an ABS width of the magnetic head is in a range of 150~200 μm so that the frictional coefficient of the magnetic head and the 5-inch metal thin-film recording disk is set within a predetermined intermediate range extending approximately from the minimum frictional coefficient point to a point where the frictional coefficient of the magnetic head and 5-inch metal thin-film recording disc is 0.15, on a Stribeck diagram which indicates the relation of the relative velocity of the magnetic head and the recording disc to the frictional coefficient between the magnetic head and the recording disk.

5. A magnetic disk unit comprising:
   a magnetic head;
   a 3-inch metal thin-film recording disk to and from which information is recorded and retrieved by the magnetic head;
   means for moving the magnetic head and 3-inch metal thin-film recording disk relative to each other, the relative velocity of the 3-inch metal thin-film recording disk and the magnetic head being in a range of approximately 8~12 m/s,
   wherein an ABS width of the magnetic head in a range of 170~250 μm is used so that the frictional coefficient of the magnetic head and the 3-inch metal thin-film recording disk is set within a predetermined intermediate range extending from the minimum frictional coefficient point to a point where the frictional coefficient of the magnetic head and the 3-inch metal thin-film recording disk is 0.15, on a Stribeck diagram which indicates the relation of the relative velocity of the magnetic head and the recording disc to the frictional coefficient between the magnetic head and the recording disk.

6. A magnetic disk unit comprising:
   a magnetic head;
   a 5-inch magnetic coated recording disk to and from which information is recorded and retrieved by the magnetic head;
   means for moving the magnetic head and 5-inch magnetic coated recording disk relative to each other, a relative velocity of the 5-inch magnetic coated recording disk and the magnetic head being in a range of 12~20 m/s,
   wherein an ABS width of the magnetic head is in a range of 220~300 μm so that the frictional coefficient between the magnetic head an the 5-inch magnetic coated recording disk is set within a predetermined intermediate range extending from the minimum frictional coefficient point to a point where the frictional coefficient between the magnetic head and the recording disk is 0.15 on a Stribeck diagram which indicates the relation of the relative velocity of the magnetic head and the recording disc to the frictional coefficient between the magnetic head and the recording disk.

7. A magnetic disk unit comprising:
   a magnetic head;
   a 3-inch magnetic coated recording disk to and from which information is recorded and regenerated by the magnetic head;
   means for moving the magnetic head and the 3-inch magnetic coated recording disk relative to each other, a relative velocity of the 3-inch magnetic coated recording disk and the magnetic head being in a range of 8~12 m/s, wherein an ABS width of the magnetic head is in a range of 250~350 μm so that the frictional coefficient of the magnetic head and the 3-inch magnetic coated recording disk is set within a predetermined intermediate range extending from a minimum frictional coefficient point to a point where the frictional coefficient between the magnetic head and the recording disk is 0.15, on a Stribeck diagram which indicates the relation of the relative velocity f the magnetic head and the recording disc to the frictional coefficient between the magnetic head and the recording disk.

8. A magnetic disk unit having at least one magnetic head and a magnetic recording medium to and from which information is recorded and retrieved by the magnetic head, wherein the friction coefficient between the magnetic head and the magnetic recording medium is set within a predetermined intermediate range extending from the minimum friction coefficient to a point where the friction coefficient between the magnetic head and the magnetic recording medium is 0.15, on a Stribeck diagram which indicates the relation of relative velocity of the magnetic head to the magnetic recording medium, to the friction coefficient between the magnetic head and magnetic recording medium.

9. The magnetic disk unit as claimed in claim 8, wherein, when the friction coefficient at the minimum friction coefficient is 0.03 on the Stribeck diagram, the predetermined intermediate range extending between a point where the friction coefficient is 0.03 and a point where the friction coefficient is 0.15, and the relative velocity at 0.15 is smaller than that at the point where the friction coefficient is 0.03, on the Stribeck diagram.

* * * * *